US009488522B2

(12) United States Patent
Chen (10) Patent No.: US 9,488,522 B2
(45) Date of Patent: Nov. 8, 2016

(54) IDENTIFYING METHOD AND DEVICE FOR DETECTING SPECIFIC REGION OF TRANSLUCENT MEDIUM

(71) Applicant: HiTi Digital, Inc., New Taipei (TW)

(72) Inventor: Tsung-Yueh Chen, New Taipei (TW)

(73) Assignee: HiTi Digital, Inc., New Taipei (TW)

( * ) Notice: Subject to any disclaimer, the term of this patent is extended or adjusted under 35 U.S.C. 154(b) by 106 days.

(21) Appl. No.: 14/682,119

(22) Filed: Apr. 9, 2015

(65) Prior Publication Data

US 2016/0223396 A1    Aug. 4, 2016

(30) Foreign Application Priority Data

Feb. 4, 2015    (TW) ............... 104103762 A (51) Int. Cl.
*G01J 1/44* (2006.01)
*G01B 11/14* (2006.01)

(52) U.S. Cl.
CPC . *G01J 1/44* (2013.01); *G01B 11/14* (2013.01)

(58) Field of Classification Search
CPC ...... G01J 1/44; G01J 2001/444; G01B 11/14
USPC ............... 250/221, 222.1, 559.29, 559.36, 250/559.39; 356/614, 615, 622
See application file for complete search history.

(56) References Cited

U.S. PATENT DOCUMENTS

| 6,323,954 | B1 | 11/2001 | Halter |
| 6,353,429 | B1 | 3/2002 | Long |
| 6,903,661 | B1 | 6/2005 | Tseng |
| 8,339,615 | B2 * | 12/2012 | Dohi .................... G01B 11/028 250/559.36 |

FOREIGN PATENT DOCUMENTS

TW    I464385 B    12/2014

* cited by examiner

*Primary Examiner* — Kevin Pyo
(74) *Attorney, Agent, or Firm* — CKC & Partners Co., Ltd.

(57) ABSTRACT

An identifying method for detecting a specific region of a translucent medium provided includes steps as follows. A light sensing module is adjusted to allow an operation point of the light sensing module to be in an active region. Light is emitted to a driven translucent medium by a light-emitting module. The light been passed through the translucent medium is sensed by the light sensing module to generate a first light-intensity signal based on the light sensed at one time instant, and the voltages of the first light-intensity signal are regulated to derive a second light-intensity signal. A voltage level of the first light-intensity signal is compared with that of the second light-intensity signal to generate a comparison result. A determination of whether a specific region of the translucent medium is positioned between light sensing module and light-emitting module is made based on the comparison result.

19 Claims, 8 Drawing Sheets

IDENTIFYING METHOD AND DEVICE FOR DETECTING SPECIFIC REGION OF TRANSLUCENT MEDIUM

RELATED APPLICATIONS

This application claims priority to Taiwan Application Serial Number 104103762, filed Feb. 4, 2015, which is herein incorporated by reference.

BACKGROUND

1. Field of Disclosure

The present disclosure relates to an identifying method and device for detecting a specific region of a translucent medium. More particularly, the present disclosure relates to an identifying method and device for detecting a specific region of a translucent medium based on a self comparison result of a light sensing intensity sensed at one time instant.

2. Description of Related Art

Due to the light transmission character of a translucent medium, such as a translucent card or a translucent slide, it is not easy for a sensing machine to distinguish whether the translucent medium has passed, and even more, the sensing machine cannot detect a relative position of the translucent medium. In order to allow the sensing machine to be able to detect the translucent medium, a light-shielding pattern layer or infrared transmission ink is disposed at a specific position of the translucent medium according to the prior art method so as to assist the sensing machine in detecting the specific position of the translucent medium even when the translucent medium is moving.

In addition, another prior art method is to compare signals respectively detected at different time points by the light sensor under the circumstances that the translucent medium is moving so as to serve as a judgment basis for the specific position (such as an edge of the translucent medium) of the translucent medium.

However, the translucent medium that satisfies the specifications is required to be manufactured according to the above methods, and the above methods need to cooperate with an additional signal amplifier and digital/analog conversion circuit. Not only is the acquisition cost of sensing machine increased, but the manufacturing cost of the translucent medium is also increased.

For the forgoing reasons, there is a need to solve the above-mentioned inconveniences and shortcomings by providing an identifying method and device for detecting a specific region of a translucent medium, which is also an objective that the relevant industry is eager to achieve.

SUMMARY

An objective of the present disclosure is to provide an identifying method and device for detecting a specific region of a translucent medium to solve the above-mentioned problems of the prior art.

For achieving the foregoing objective, according one embodiment, an identifying device for detecting a specific region of a translucent medium is provided. The identifying device for detecting the specific region of the translucent medium comprises a driving unit, a light-emitting module, a light sensing module, and a processing unit. The driving unit is configured to drive a translucent medium to move along a direction. The light-emitting module is configured to emit light to intersect the direction. The light sensing module is configured to sense the light passed through the translucent medium at one time instant so as to generate a first light-intensity signal, and divide and stabilize the voltages of the first light-intensity signal to derive a second light-intensity signal, and to compare the first light-intensity signal with the second light-intensity signal to generate a comparison result. The processing unit is configured to determine whether a specific region of the translucent medium is exactly positioned between the light-emitting module and the light sensing module based on the comparison result. Also, the light-emitting module or the light sensing module is adjusted to allow an operation point of the light sensing module on a current-voltage characteristic curve to be in an active region of the current-voltage characteristic curve.

In the foregoing, the light sensing module comprises a comparison device, a voltage regulator circuit, and a light detection transistor. The comparison device has a first input terminal, a second input terminal, and an output terminal, and the comparison device is configured to compare a voltage level of the first light-intensity signal with a voltage level of the second light-intensity signal so as to generate the comparison result. The voltage regulator circuit is electrically connected to the second input terminal of the comparison device, and configured to divide and stabilize the voltages of the first light-intensity signal to derive the second light-intensity signal, and then transmits the second light-intensity signal to the second input terminal of the comparison device. The light detection transistor is electrically connected to the first input terminal of the comparison device and the voltage regulator circuit, and configured to sense the light at the one time instant so as to generate the first light-intensity signal, and transmits the first light-intensity signal to the first input terminal of the comparison device and the voltage regulator circuit.

In the foregoing, the voltage regulator circuit comprises a voltage divider circuit and a voltage buffer circuit. The voltage divider circuit is electrically connected to the light detection transistor, and configured to divide the voltages of the first light-intensity signal. A voltage level of the first light-intensity signal which the voltages thereof has been divided is lower than the voltage level of the first light-intensity signal which the voltages thereof has not divided yet.

The voltage buffer circuit is electrically connected to the voltage divider circuit and the second input terminal of the comparison device, and configured to stabilize the divided voltages of the first light-intensity signal.

In the foregoing, the voltage divider circuit comprises at least two resistors connected in series.

In the foregoing, the voltage buffer circuit comprises a capacitor.

In the foregoing, the light-emitting module comprises a light-emitting diode and a driving resistor. The driving resistor is electrically connected to the light-emitting diode. The driving resistor is a variable resistor. The variable resistor is adjusted to allow the operation point of the light detection transistor on the current-voltage characteristic curve to be in the active region of the current-voltage characteristic curve.

In the foregoing, the light sensing module further comprises a bias resistor. The bias resistor is electrically connected to the light detection transistor and the voltage regulator circuit. The bias resistor is a variable resistor. The variable resistor is adjusted to allow the operation point of the light detection transistor on the current-voltage characteristic curve to be in the active region of the current-voltage characteristic curve.

In the foregoing, the light-emitting module and the light sensing module are located on two opposite sides of the translucent medium.

In the foregoing, the light-emitting module and the light sensing module are located on a same side of the translucent medium.

The disclosure also provides an identifying method for detecting a specific region of a translucent medium. The identifying method for detecting the specific region of the translucent medium comprises steps as follows: (A). adjusting a light-emitting module or a light sensing module to allow an operation point of the light sensing module on a current-voltage characteristic curve to be in an active region of the current-voltage characteristic curve; (B). driving a translucent medium; (C). emitting light to the driven translucent medium by the light-emitting module; (D). sensing the light which has been passed through the translucent medium by the light sensing module to generate a first light-intensity signal based on the light sensed at one time instant, dividing and stabilizing voltages of the first light-intensity signal to derive a second light-intensity signal; (E). comparing a voltage level of the first light-intensity signal with a voltage level of the second light-intensity signal to generate a comparison result; and (F). determining whether a specific region of the translucent medium is exactly positioned between the light-emitting module and the light sensing module based on the comparison result.

In the foregoing, when the specific region of the translucent medium is an edge of the translucent medium, the above (F) further comprises: determining whether the edge of the translucent medium is exactly positioned between the light-emitting module and the light sensing module when the voltage level of the first light-intensity signal is lower than the voltage level of the second light-intensity signal.

In the foregoing, when the specific region of the translucent medium is one of a plurality of grating convex lenses of the translucent medium, the above (F) further comprises: determining whether the one of the plurality of grating convex lenses of the translucent medium is exactly positioned between the light-emitting module and the light sensing module when the voltage level of the first light-intensity signal is higher than the voltage level of the second light-intensity signal.

In the foregoing, when the specific region of the translucent medium is a furrow between any of the two adjacent convex lenses of the translucent medium, the above (F) further comprises: determining that the furrow between any of the two adjacent grating convex lenses of the translucent medium is exactly positioned between the light-emitting module and the light sensing module when the voltage level of the first light-intensity signal is lower than the voltage level of the second light-intensity signal.

In the foregoing, the above (A) further comprises: adjusting light intensities of the light-emitting module.

In the foregoing, the above (A) further comprises: adjusting resistance values of a bias resistor of the light sensing module.

The disclosure further provides an identifying method for detecting a specific region of a translucent medium. The identifying method for detecting the specific region of the translucent medium comprises steps as follows: adjusting a light-emitting module or a light sensing module to allow an operation point of the light sensing module on a current-voltage characteristic curve to be in an active region of the current-voltage characteristic curve; driving a translucent card; emitting light to the driven translucent card by the light-emitting module; sensing the light which has been passed through the translucent card by the light sensing module to generate a first light-intensity signal based on the light sensed at one time instant, dividing and stabilizing voltages of the first light-intensity signal to derive a second light-intensity signal; comparing a voltage level of the first light-intensity signal with a voltage level of the second light-intensity signal to generate a comparison result; and determining that an edge of the translucent card is exactly positioned between the light-emitting module and the light sensing module when the comparison result is that the voltage level of the first light-intensity signal is lower than the voltage level of the second light-intensity signal; determining that a medium body of the translucent card is exactly positioned between the light-emitting module and the light sensing module when the comparison result is that the voltage level of the first light-intensity signal is higher than the voltage level of the second light-intensity signal.

The disclosure still provides an identifying method for detecting a specific region of a translucent medium. The identifying method for detecting the specific region of the translucent medium comprises steps as follows: adjusting a light-emitting module or a light sensing module to allow an operation point of the light sensing module on a current-voltage characteristic curve to be in an active region of the current-voltage characteristic curve; driving a translucent grating structure; emitting light to the driven translucent grating structure by the light-emitting module; sensing the light which has been passed through the translucent grating structure by the light sensing module to generate a first light-intensity signal based on the light sensed at one time instant, dividing and stabilizing voltages of the first light-intensity signal to derive a second light-intensity signal; comparing a voltage level of the first light-intensity signal with a voltage level of the second light-intensity signal to generate a comparison result; and determining that a furrow between any of two adjacent grating convex lenses of the translucent grating structure is exactly positioned between the light-emitting module and the light sensing module when the comparison result is that the voltage level of the first light-intensity signal is lower than the voltage level of the second light-intensity signal.

In the foregoing, the identifying method for detecting the specific region of the translucent medium further comprises: determining that an edge of the translucent grating structure is exactly positioned between the light-emitting module and the light sensing module when the comparison result being generated for a first time is that the voltage level of the first light-intensity signal is lower than the voltage level of the second light-intensity signal.

In the foregoing, the identifying method for detecting the specific region of the translucent medium further comprises: determining that one of the grating convex lenses of the translucent grating structure is exactly positioned between the light-emitting module and the light sensing module when the comparison result is that the voltage level of the first light-intensity signal is higher than the voltage level of the second light-intensity signal.

Therefore, as compared with the prior art, the present disclosure identifying method and device only needs to make a self comparison between the light-intensity signal sensed at one time instant and the divide and stabilize light-intensity signal sensed at the one time instant without cooperating with the additional signal amplifier and digital/analog conversion circuit. Not only is the equipment acquisition cost saved, but the complexity in circuit configuration is also reduced.

It is to be understood that both the foregoing general description and the following detailed description are by examples, and are intended to provide further explanation of the disclosure as claimed.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

In the drawings.

DESCRIPTION OF THE EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

In view of the increased equipment acquisition cost of the sensing machine or increased manufacturing cost of the translucent medium according to the identifying method for detecting a moving translucent medium of the prior art sensing machine, the present disclosure identifying method and device sense light travelled from the translucent medium at one time instant based on the principle that the light intensity sensed will vary when the light passes through different specific regions of the translucent medium so as to generate a light-intensity signal. A self comparison is then made between the light-intensity signal and the divided and stabilized light-intensity signal to identify whether one of the specific regions of the translucent medium is exactly positioned between the light-emitting module and the light sensing module correspondingly so as to serve a basis of positioning.

First Embodiment

Figure 1:
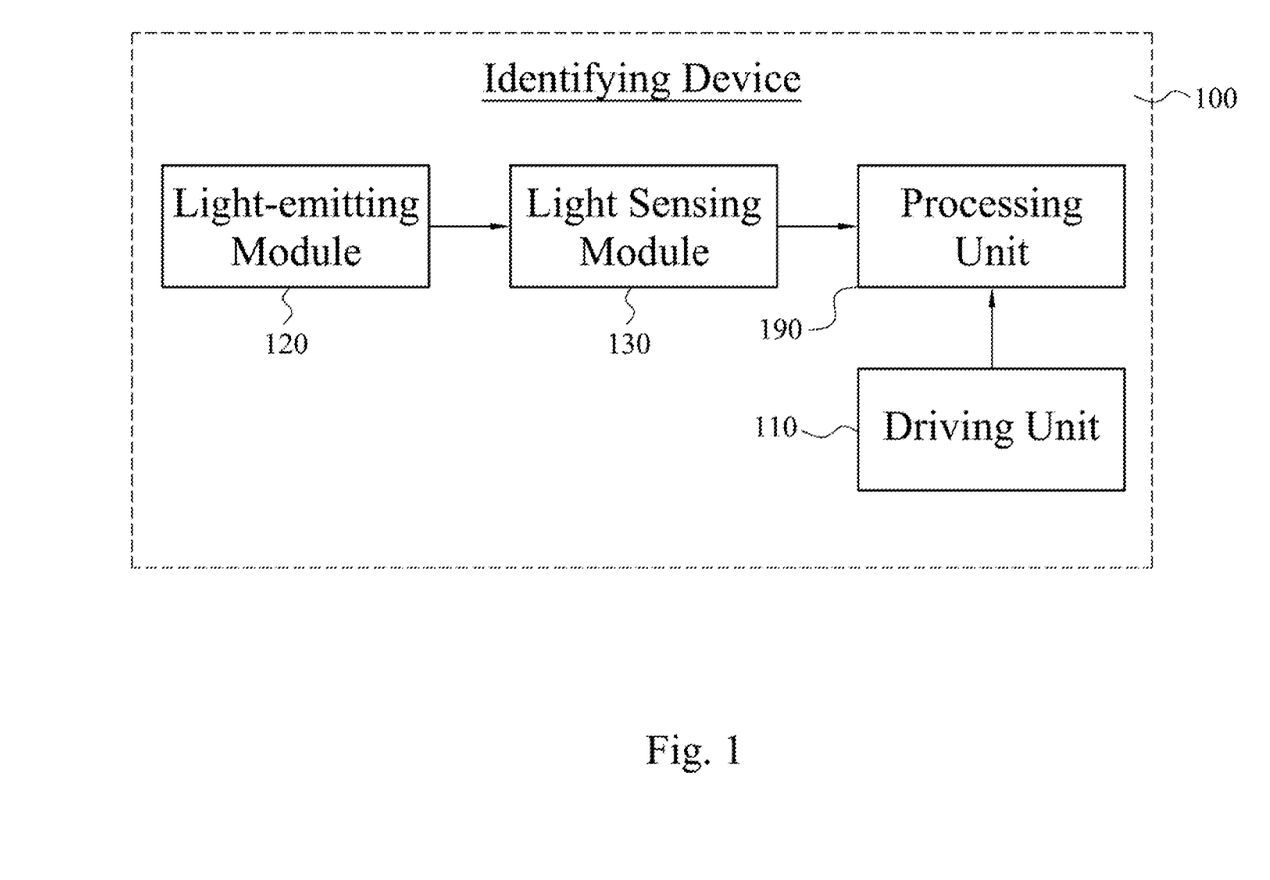
FIG. 1 depicts a block diagram of an identifying device for detecting a specific region of a translucent medium according to a first embodiment of this disclosure.

FIG. 1 depicts a block diagram of an identifying device 100 for detecting a specific region of a translucent medium according to a first embodiment of this disclosure. As shown in FIG. 1, an identifying device 100 for detecting a specific region of a translucent medium according to the present disclosure comprises a driving unit 110, a light-emitting module 120, a light sensing module 130, and a processing unit 190. The driving unit 110 is configured to drive a translucent medium to move linearly along a direction. The light-emitting module 120 is configured to emit light intersecting the direction. The light sensing module 130 is configured to receive the light emitted by the light-emitting module 120 and generate a first light-intensity signal corresponding to an intensity of the light. Whenever the light sensing module 130 receives and senses the first light-intensity signal at one time instant, the voltages of the first light-intensity signal is divided and stabilized by the light sensing module 130 to derive a second light-intensity signal. The second light-intensity signal is then compared with the first light-intensity signal to generate a comparison result. The processing unit 190 is electrically connected to the light sensing module 130 and the driving unit 110 to determine whether a specific region of the translucent medium is exactly positioned between the light-emitting module 120 and the light sensing module 130 based on the comparison result so as to serve a basis for positioning.

Figure 2:
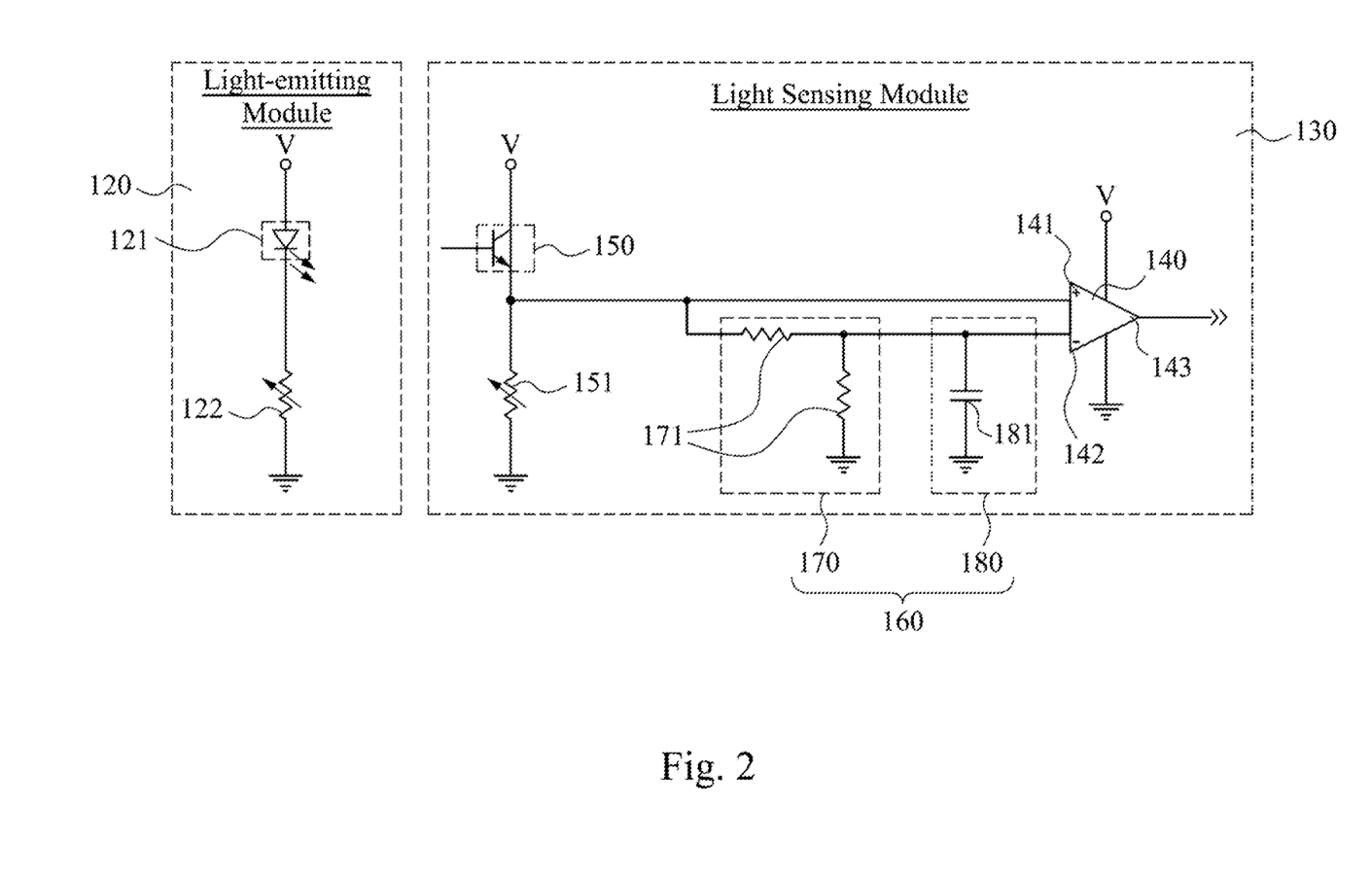
FIG. 2 depicts a circuit schematic diagram of the light-emitting module and the light sensing module in FIG. 1.

FIG. 2 depicts a circuit schematic diagram of the light-emitting module 120 and the light sensing module 130 in FIG. 1. In greater detail, the light-emitting module 120 comprises a light-emitting diode 121 and a driving resistor 122 according to the present embodiment, as shown in FIG. 1 and FIG. 2. The driving resistor 122 is electrically connected to the light-emitting diode 121. The light sensing module 130 comprises a comparison device 140, a light detection transistor 150, a voltage regulator circuit 160, and a bias resistor 151. The bias resistor 151 is electrically connected to the light detection transistor 150. The voltage regulator circuit 160 is electrically connected to the comparison device 140 and the light detection transistor 150. The comparison device 140 is electrically connected to the processing unit 190, the light detection transistor 150, and the voltage regulator circuit 160. For example, the comparison device 140 has a first input terminal 141 (+), a second input terminal 142 (−), and an output terminal 143. The first input terminal 141 of the comparison device 140 is electrically connected to the light detection transistor 150. The second input terminal 142 of the comparison device 140 is electrically connected to the voltage regulator circuit 160. The output terminal 143 of the comparison device 140 is electrically connected to the processing unit 190. Whenever the light detection transistor 150 senses the light to generate the first light-intensity signal at the one time instant, the light detection transistor 150 transmits the first light-intensity signal to the first input terminal 141 of the comparison device 140 and the voltage regulator circuit 160. The voltages of the first light-intensity signal transmitted by the light detection transistor 150 are divided and stabilized by the voltage regulator circuit 160 to derive the second light-intensity signal. The second light-intensity signal is transmitted to the comparison device 140 via the second input terminal 142 of the comparison device 140. After the comparison device 140 compares a voltage level of the first light-intensity signal with a voltage level of the second light-intensity signal, the comparison device 140 generates the comparison result. Hence, the processing unit 190 is able to obtain the comparison result from the output terminal 143 of the comparison device 140, and then determines whether the specific region of the translucent medium is exactly positioned between the light-emitting module 120 and the light sensing module 130 based on the comparison result so as to serve a basis for positioning.

The voltage regulator circuit 160 comprises a voltage divider circuit 170 and a voltage buffer circuit 180 according to the present embodiment. The voltage divider circuit 170 is electrically connected to the light detection transistor 150 so as to divide the voltages of the first light-intensity signal. A voltage level of the first light-intensity signal which the voltages thereof has been divided is lower than the voltage level of the first light-intensity signal which the voltages thereof has not divided yet. The voltage buffer circuit 180 is electrically connected to the voltage divider circuit 170 and the second input terminal 142 of the comparison device 140 so as to stabilize the divided voltages of the first light-intensity signal and to derive the second light-intensity signal.

For example, in the present embodiment, the voltage divider circuit 170 comprises at least two resistors 171 connected in series. The two resistors 171 are configured to lower the voltage level of the first light-intensity signal so as to differ from the first light-intensity signal transmitted to the first input terminal 141 of the comparison device 140. The voltage buffer circuit 180 comprises at least one capacitor 181. When the light passes through the specific region (such as an edge) of the translucent medium so that the voltage level of the first light-intensity signal has an abrupt significant drop, decreased amplitude of the second light-intensity signal is not too excessive because the capacitor 181 is able to discharge. As a result, the voltage level of the second light-intensity signal is not too low. Since the capacitor 181 needs to discharge, decreased amplitude of the first light-intensity signal is significantly larger than the decreased amplitude of the second light-intensity signal. Hence, a cross point is generated by the first light-intensity signal and the second light-intensity signal. Similarly, when the light passes through the translucent medium itself so that the first light-intensity signal abruptly increases, increased amplitude of the first light-intensity signal is significantly larger than increased amplitude of the second light-intensity signal because the capacitor 181 needs to be charged. A cross point is thus generated by the first light-intensity signal and the second light-intensity signal.

It should be understood that the first light-intensity signal transmitted from the light detection transistor 150 is directly transmitted to the first input terminal 141 of the comparison device 140 without being processed (level change), and the second light-intensity signal is equal to the divided and stabilized first light-intensity signal. In addition, the first light-intensity signal and the second light-intensity signal are both in an analog format, and the comparison result is a digital signal in a binary format (1 or 0) according to the present embodiment.

Figure 3:
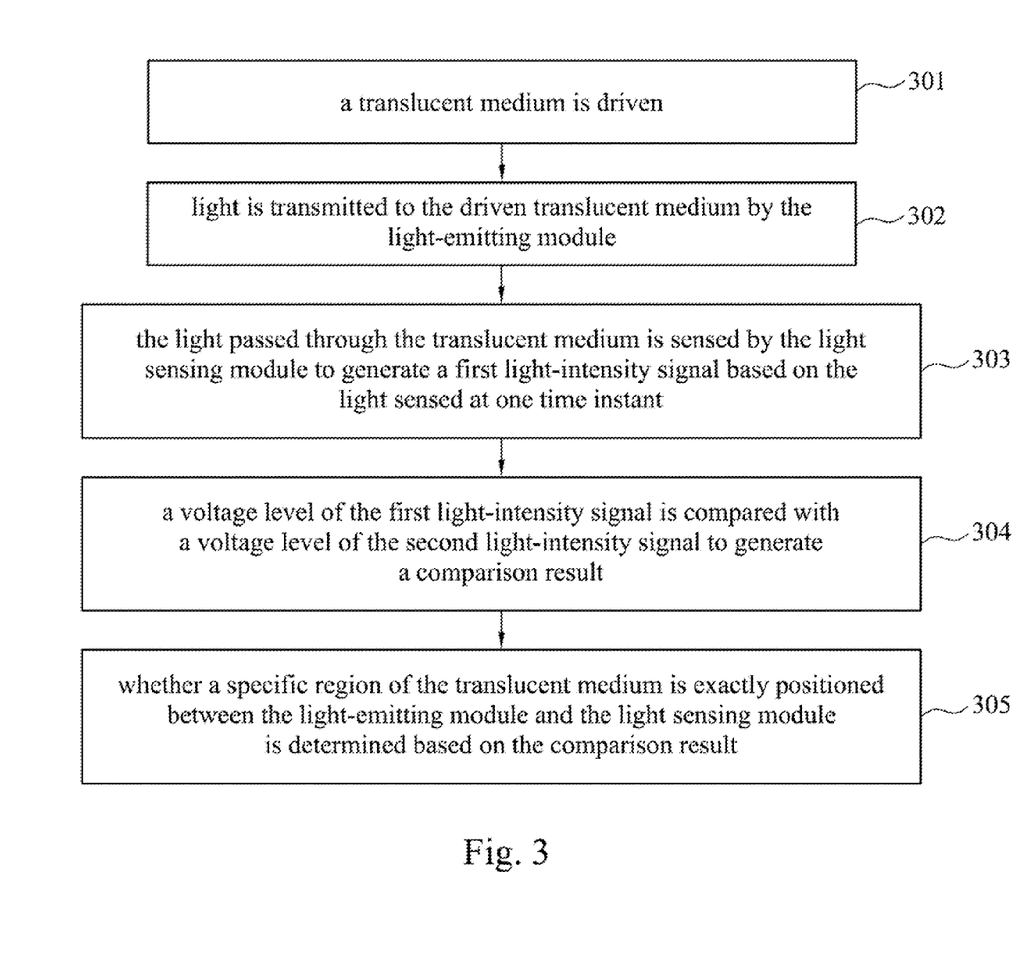
FIG. 3 depicts a flowchart of an identifying method performed by the identifying device in FIG. 1.

FIG. 3 depicts a flowchart of an identifying method for detecting a specific region of a translucent medium according to the present disclosure. As shown in FIG. 1 and FIG. 3, an identifying method for detecting a specific region of a translucent medium according to the present disclosure comprises a plurality of steps as follows. In step 301, a translucent medium is driven. In step 302, light is transmitted to the driven translucent medium by the light-emitting module 120. In step 303, the light passed through the translucent medium is sensed by the light sensing module 130 to generate a first light-intensity signal based on the light sensed at one time instant. The voltages of first light-intensity signal are then divided and stabilized to derive a second light-intensity signal. In step 304, a voltage level of the first light-intensity signal is compared with a voltage level of the second light-intensity signal to generate a comparison result. In step 305, whether a specific region of the translucent medium is exactly positioned between the light-emitting module 120 and the light sensing module 130 is determined based on the comparison result so as to serve a basis for positioning.

Hence, as compared with the prior art, the present disclosure only needs to make a self comparison whenever the light detection transistor senses an instant light change affected by the translucent medium. As a result, there is no necessity to cooperate with the additional signal amplifier and digital/analog conversion circuit. Not only is the equipment acquisition cost saved, but the complexity in circuit configuration is also reduced.

Second Embodiment

According to the present embodiment, the present disclosure identifying device 100 for detecting the specific region of the translucent medium and the present disclosure identifying method for detecting the specific region of the translucent medium are utilized to detect an edge of a translucent medium so as to serve as a basis for positioning. For example, when the translucent medium is a translucent card (or transparent card) and the translucent card has been detected, a subsequent action for printing the card or reading data from the card can be performed. For example, an automated teller machine identifies that the translucent card has passed a specified region so as to initiate relevant functions for reading the card.

Figure 4A:
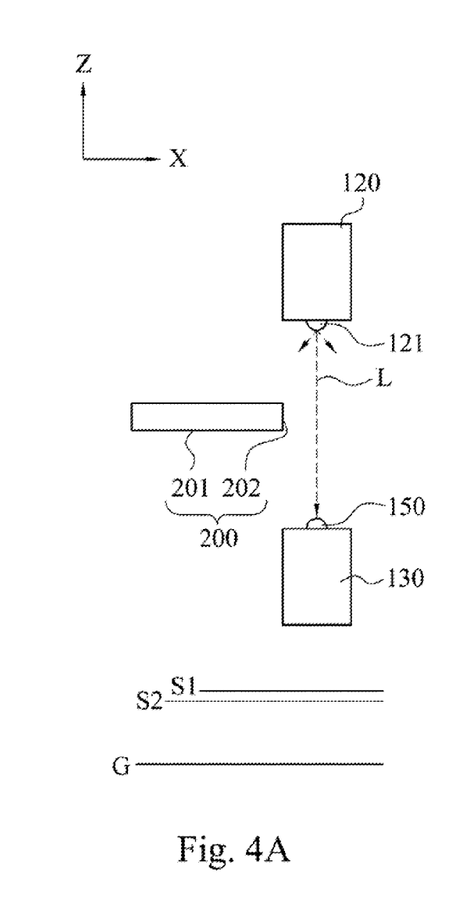
FIG. 4A to FIG. 4C depict schematic diagrams of operations when a light-emitting module, a light sensing module, and a translucent medium are at different relative positions and signal changes correspondingly according to a second embodiment of this disclosure.
Figure 4B:
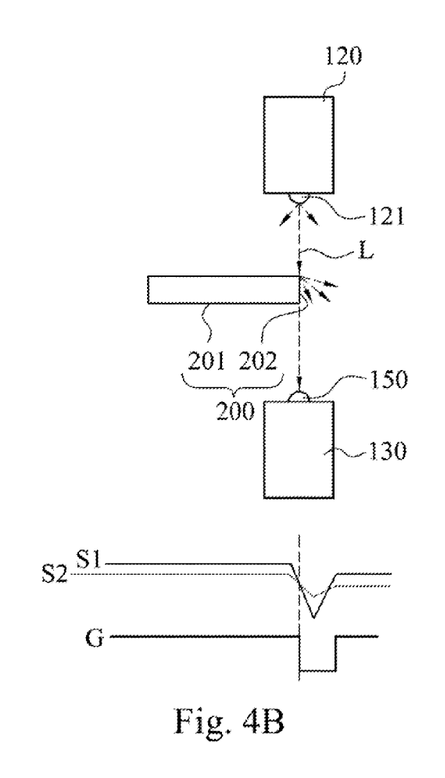
Figure 4C:
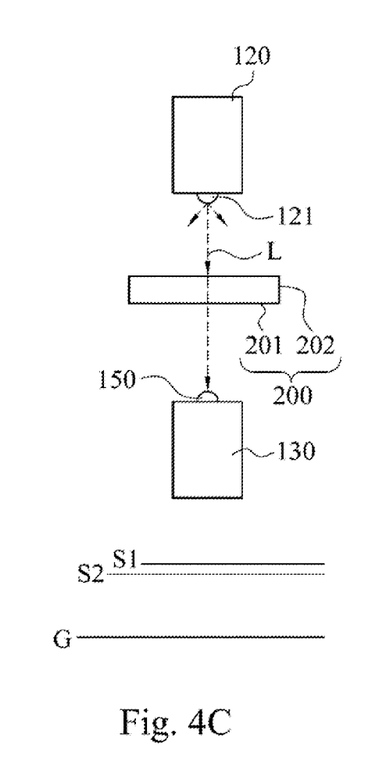

FIG. 4A to FIG. 4C depict schematic diagrams of operations when the light-emitting module 120, the light sensing module 130, and a translucent medium 200 are at different relative positions and signal changes correspondingly according to a second embodiment or this disclosure. As shown in FIG. 4A, when a translucent medium 200 is driven to move along a first direction X, the light-emitting diode 121 emits light L to the light detection transistor 150 along a second direction Z. The first direction X is substantially perpendicular to the second direction Z. In the present embodiment, the light detection transistor 150 is an optical interrupter. Hence, the light-emitting module 120 and the light sensing module 130 are respectively disposed on two opposite sides of the translucent medium 200.

As shown in FIG. 4A and FIG. 2, when the translucent medium 200 moves along the first direction X but an edge 202 of the translucent medium 200 has not been positioned between the light-emitting diode 121 and the light detection transistor 150, all the light L emitted from the light-emitting diode 121 can be received by the light detection transistor 150 because there is no barrier between the light-emitting diode 121 and the light detection transistor 150. That is, the light detection transistor 150 can sense a whole (approximately 100%) light intensity of the light-emitting diode 121.

In greater detail, as shown in FIG. 4A and FIG. 2, since the light detection transistor 150 is able to sense the whole (approximately 100%) light intensity of the light-emitting diode 121, the light detection transistor 150 continues to receive the light L emitted from the light-emitting diode 121 before the edge 202 of the translucent medium 200 has been positioned between the light-emitting diode 121 and the light detection transistor 150. A voltage level of a first light-intensity signal S1 is thus higher than a voltage level of a second light-intensity signal S2 and the first light-intensity signal S1 and the second light-intensity signal S2 are stable lines parallel to each other after the first light-intensity signal S1 has been processed by the voltage regulator circuit 160. Therefore, after the comparison device 140 determines that the voltage level of the first light-intensity signal S1 is higher than the voltage level of the second light-intensity signal S2, a digital signal G which is "1" is output to the processing unit 190 from the output terminal 143. The processing unit 190 reads the digital signal G which is "1" thus determines that the edge 202 of the translucent medium 200 has not been positioned between the light-emitting diode 121 and the light detection transistor 150.

Then, as shown in FIG. 48, when the translucent medium 200 moves along the first direction X and the edge 202 of the translucent medium 200 is exactly positioned between the light-emitting diode 121 and the light detection transistor 150, the light L emitted from the light-emitting diode 121 will be interfered with by the edge 202 of the translucent medium 200 so as to be scattered in other directions because the edge 202 of the translucent medium 200 is not flat and is located at a junction of different media. Light intensity sensed by the light detection transistor 150 at this time point thus drops abruptly. The light detection transistor 150 is able to sense approximately 96% of the light intensity of the light-emitting diode 121, but the present disclosure is not limited in this regard.

In greater detail, as shown in FIG. 48 and FIG. 2, since the light intensity received by the light detection transistor 150 drops abruptly, the first light-intensity signal S1 thus has a significant decreased amplitude. However, owing to a discharge of the voltage buffer circuit 180 (such as the capacitor 181) to the second light-intensity signal S2, a decreased amplitude of the second light-intensity signal S2 is not as large as the decreased amplitude of the first light-intensity signal S1 and is smaller than the decreased amplitude of the first light-intensity signal S1, which in turn causes the voltage level of the second light-intensity signal S2 to be higher than the voltage level of the first light-intensity signal S1. Therefore, after the comparison device 140 determines that the voltage level of the first light-intensity signal S1 is lower than the voltage level of the second light-intensity signal S2, the digital signal G which is "0" is output to the processing unit 190 from the output terminal 143. The processing unit 190 reads the digital signal G which is "0" thus determines that the edge 202 of the translucent medium 200 is exactly positioned between the light-emitting diode 121 and the light detection transistor 150.

After that, as shown in FIG. 4C, when the translucent medium 200 continues to move along the first direction X and the edge 202 of the translucent medium 200 has passed between the light-emitting diode 121 and the light detection transistor 150, all the light L emitted from the light-emitting diode 121 can pass through a medium body 201 of the translucent medium 200 and be sensed by the light detection transistor 150 because of the light transmission character of the medium body 201 of the translucent medium 200. Hence, the light intensity sensed by the light detection transistor 150 at this time point increases slightly. The light detection transistor 150 can sense, for example, approximately 98% of the light intensity of the light-emitting diode 121, which is still less than the light intensity sensed before the translucent medium 200 has reached a space between the light-emitting diode 121 and the light detection transistor 150. However, the present disclosure is not limited in this regard.

Similarly, as shown in FIG. 4C and FIG. 2, after the edge 202 of the translucent medium 200 has passed through the light-emitting diode 121 and the light detection transistor 150, the light detection transistor 150 continues to receive the light L emitted from the light-emitting diode 121, such that the voltage level of the first light-intensity signal S1 returns back to the voltage level higher than the voltage level of the second light-intensity signal S2 after the first light-intensity signal S1 has been processed by the voltage regulator circuit 160. The first light-intensity signal S1 and the second light-intensity signal S2 are stable lines parallel to each other.

Therefore, after the comparison device 140 determines that the voltage level of the first light-intensity signal S1 is higher than the voltage level of the second light-intensity signal S2, the digital signal G which is "1" is output to the processing unit 190 from the output terminal 143. After the processing unit 190 reads the digital signal G which is "0" and then reads the digital signal G which is "1" from the output terminal 143 of the comparison device 140, the processing unit 190 will determine that the medium body 201 of the translucent medium 200 is exactly positioned between the light-emitting diode 121 and the light detection transistor 150.

Similarly, it should be understood that when the processing unit 190 reads the digital signal G which is "0" again, the processing unit 190 will determine that another edge of the translucent medium 200 is exactly positioned between the light-emitting diode 121 and the light detection transistor 150.

Third Embodiment

According to the present embodiment, a present disclosure identifying device and identifying method for detecting a specific region of a translucent medium are utilized for detecting a translucent grating structure, especially for detecting positions of various gratings in the grating structure so as to serve as a basis for positioning for subsequent printing.

Figure 5A:
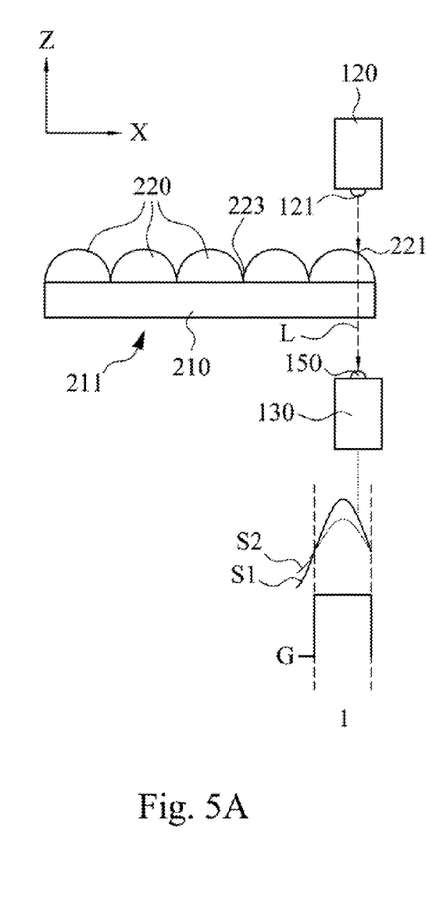
FIG. 5A to FIG. 5C depict schematic diagrams of operations when a light-emitting module, a light sensing module, and a translucent grating structure are at different relative positions and signal changes correspondingly according to a third embodiment of this disclosure.
Figure 5B:
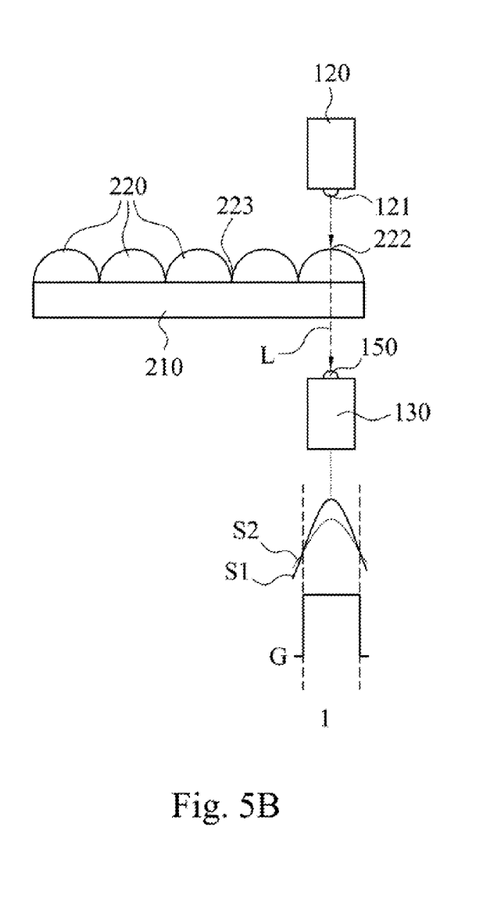
Figure 5C:
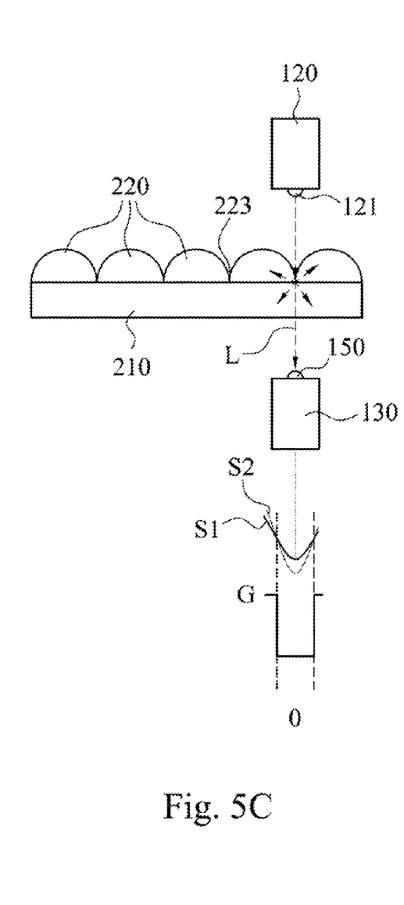

FIG. 5A to FIG. 5C depict schematic diagrams of operations when the light-emitting module 120, the light sensing module 130, and a translucent grating structure 210 are at different relative positions and signal changes correspondingly according to a third embodiment or this disclosure. Owing to the light transmission character of a translucent grating structure 210, the light L emitted from the light-emitting diode 121 can pass through the translucent grating structure 210 and be sensed by the light detection transistor 150. For example, as shown in FIG. 5A, the translucent grating structure 210 is composed of translucent materials (such as acrylic, PVC, PET, etc.), and the translucent grating structure 210 has a flat side 211 and a cylinder side 212. Three-dimensional images, such as interlaced images, can be directly printed on the flat side 211. A plurality of grating convex lenses 220 and furrows 223 are formed on the cylinder side 212. The grating convex lenses 220 are disposed at equal intervals. The furrows 223 are formed between each of the two adjacent grating convex lenses 220. The grating convex lenses 220 present different three-dimensional visual effects when viewed from different angles.

As shown in FIG. 5A, when the driving unit 110 drives the translucent grating structure 210 to move along a first direction X, the grating convex lenses 220 of the translucent grating structure 210 pass through the space between the light-emitting diode 121 and the light detection transistor 150 in sequence. The light-emitting diode 121 emits the light L to the light detection transistor 150 along the second direction Z. The first direction X is substantially perpendicular to the second direction Z. In the present embodiment, the light detection transistor 150 is an optical interrupter. Hence, the light-emitting module 120 and the light sensing module 130 are respectively disposed on two opposite sides of the translucent grating structure 210. Especially, the light-emitting diode 121 of the light-emitting module 120 faces the cylinder side 212 of the translucent grating structure 210. The light detection transistor 150 of the light sensing module 130 faces the flat side 211 of the translucent grating structure 210.

As shown in FIG. 5A and FIG. 2, when the translucent grating structure 210 moves along the first direction X and a non-top edge surface 221 of one of the grating convex lenses 220 of the translucent grating structure 210 is exactly positioned between the light-emitting diode 121 and the light detection transistor 150, the light detection transistor 150 will senses most part (that is, not reach 100%) of light intensity of the light L because the light L emitted from the light-emitting diode 121 is refracted by the non-top edge surface 221 of the one of the grating convex lenses 220 of the translucent grating structure 210. Then, as shown in FIG. 5B and FIG. 2, when a top edge 222 of the one of the grating convex lenses 220 of the translucent grating structure 210 is exactly positioned between the light-emitting diode 121 and the light detection transistor 150, the light detection transistor 150 can sense approximately all (100%) of the light intensity of the light L emitted from the light-emitting diode 121 because all the light L emitted from the light-emitting diode 121 approximately penetrates through the top edge 222 of the one of the grating convex lenses 220 of the translucent grating structure 210 directly with nearly no refraction (there can still be a little micro refraction).

In greater detail, as shown in FIG. 5B and FIG. 2, the light detection transistor 150 receives the light L emitted from the light-emitting diode 121. A voltage level of a first light-intensity signal S1 is higher than a voltage level of a second light-intensity signal S2 and a fluctuation of the first light-intensity signal S1 is larger than a fluctuation of the second light-intensity signal S2 after the first light-intensity signal S1 has been processed by the voltage regulator circuit 160. Therefore, after the comparison device 140 determines that the voltage level of the first light-intensity signal S1 is higher than the voltage level of the second light-intensity signal S2, the digital signal G which is "1" is output to the processing unit 190 from the output terminal 143. The processing unit 190 reads the digital signal G which is "1" thus determines that the one of the grating convex lenses 220 of the translucent grating structure 210 is exactly positioned between the light-emitting module 120 and the light sensing module 130.

As shown in FIG. 5C and FIG. 2, when the translucent grating structure 210 moves along the first direction X and one of the furrows 223 of the translucent grating structure 210 is positioned between the light-emitting diode 121 and the light detection transistor 150, the light L emitted from the light-emitting diode 121 will be interfered with by the furrow 223 of the translucent grating structure 210 so as to be scattered in other directions because the furrow 223 of the translucent grating structure 210 is not flat and is located at a junction of different media. Light intensity sensed by the light detection transistor 150 at this time point thus drops abruptly. For example, the light detection transistor 150 is able to sense approximately 96% of the light intensity of the light-emitting diode 121, but the present disclosure is not limited in this regard.

In greater detail, since the light intensity received by the light detection transistor 150 drops abruptly, the first light-intensity signal S1 has a significant decreased amplitude, as shown in FIG. 5C and FIG. 2. However, owing to a discharge of the voltage buffer circuit 180 (such as the capacitor 181) to the second light-intensity signal S2, a decreased amplitude of the second light-intensity signal S2 is smaller than the decreased amplitude of the first light-intensity signal S1, which in turn causes the voltage level of the second light-intensity signal S2 to be higher than the voltage level of the first light-intensity signal S1. Therefore, after the comparison device 140 determines that the voltage level of the first light-intensity signal S1 is lower than the voltage level of the second light-intensity signal S2, the digital signal G which is "0" is output to the processing unit 190 from the output terminal 143. The processing unit 190 reads the digital signal G which is "0" thus determines that the one of the furrows 223 of the translucent grating structure 210 is exactly positioned between the light-emitting diode 121 and the light detection transistor 150.

In addition, except for detecting positions of the grating convex lenses and the furrows of the translucent grating structure 210, the present embodiment can be further utilized for detecting an edge of the translucent grating structure 210 so as to serve as a basis for subsequent applications. For example, when the processing unit 190 receives the comparison result that the voltage level of the first light-intensity signal S1 is lower than the voltage level of the second light-intensity signal S2 for the first time, the processing unit 190 thus determines that the edge of the translucent grating structure 210 is exactly positioned between the light-emitting module 120 and the light sensing module 130.

Fourth Embodiment

Figure 6:
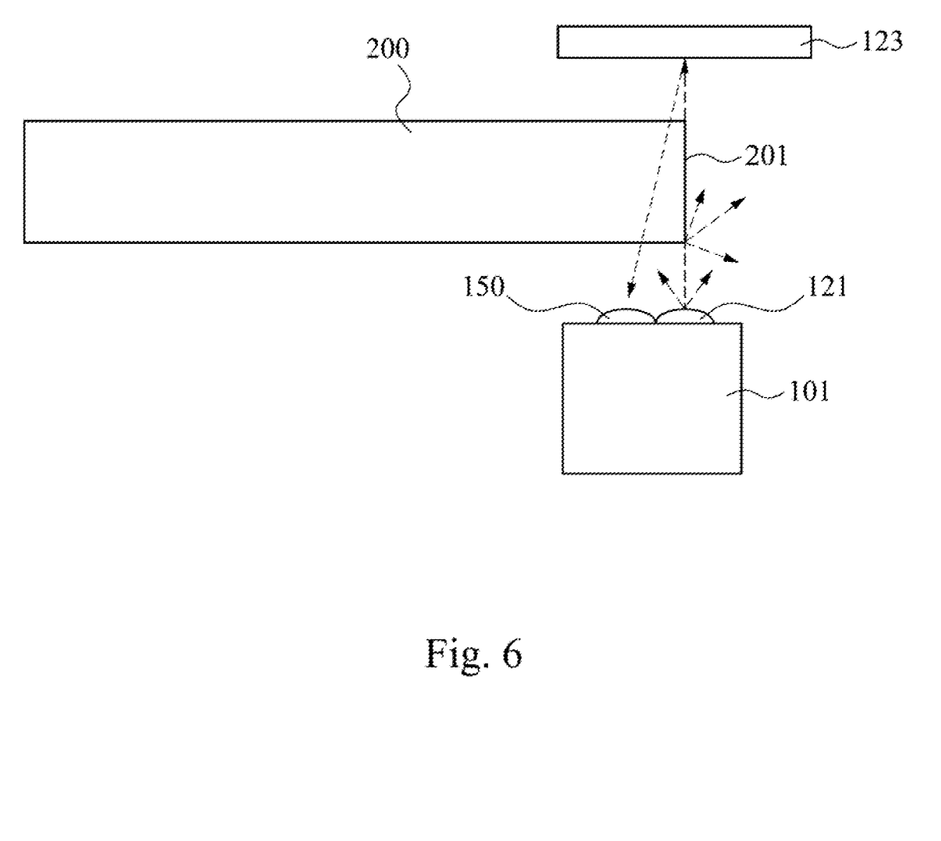
FIG. 6 depicts a schematic diagram of operations of a light-emitting module, a reflective light sensing module, and a translucent medium according to a fourth embodiment of this disclosure.

FIG. 6 depicts a schematic diagram of operations of a structure 101 of a reflective light sensing module and a translucent medium 200 according to a fourth embodiment of this disclosure. As shown in FIG. 6, a main difference between the fourth embodiment and the above second embodiment is that the light detection transistor 150 is a reflective light sensor according to the present embodiment. A light-emitting module and a light sensing module are located on a same side of the translucent medium 200. For example, the light-emitting diode 121 and the light detection transistor 150 are disposed on a same side of the translucent medium 200. The light detection transistor 150 and a reflecting plate 123 are respectively disposed on two opposite sides of the translucent medium 200. In the present embodiment, the light-emitting diode 121 and the light detection transistor 150 are disposed in a same structure 101, but the present disclosure is not limited to this.

Hence, after the light L emitted from the light-emitting diode 121 is reflected by the edge 202 of the translucent medium 200, the light detection transistor 150 can receive the reflected light L to allow the voltage regulator circuit 160, the comparison device 140, and the processing unit 190 to perform data processing correspondingly. A description in this regard is not provided.

It should be understood that the reflective light sensing module according to the present embodiment can be applied to the third embodiment, and a description in this regard is not provided.

Figure 7A:
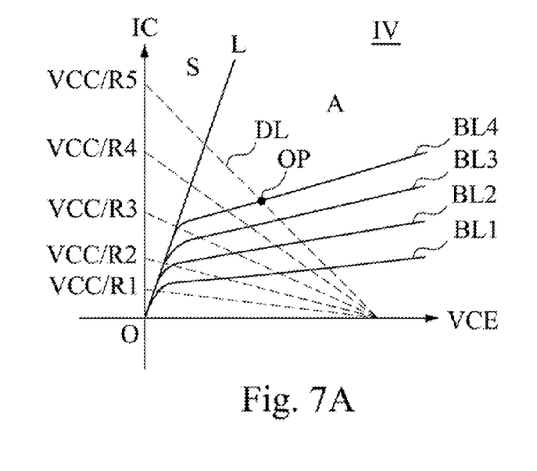
FIG. 7A to FIG. 7C depict current-voltage characteristic curves when a light sensing module corresponds to a light-emitting module.
Figure 7B:
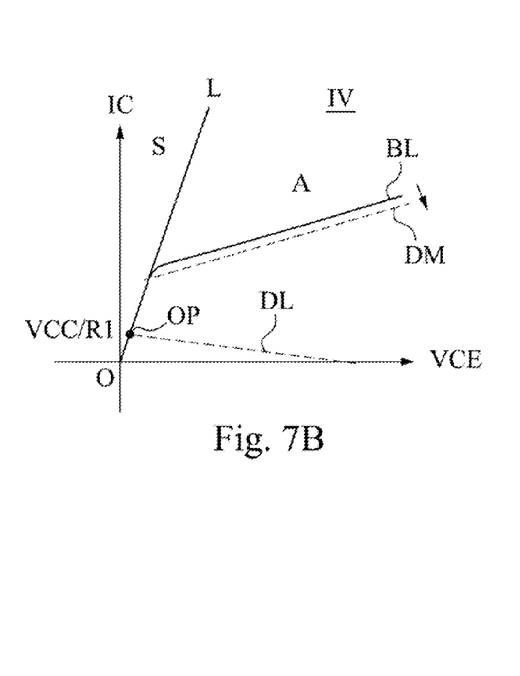
Figure 7C:
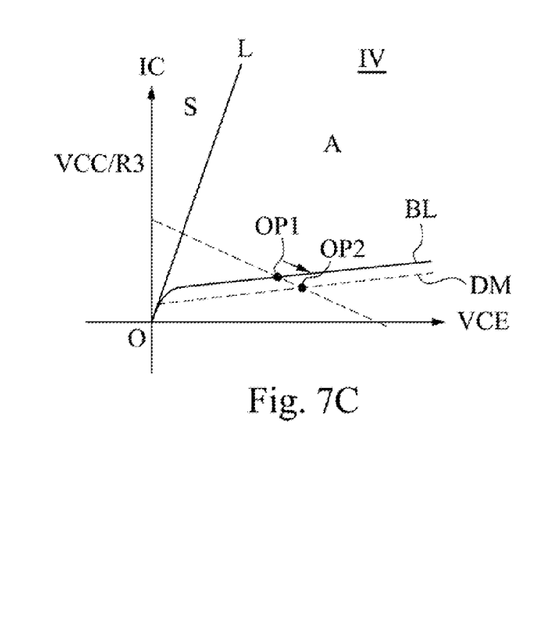

FIG. 7A to FIG. 7C depict current-voltage (I-V) characteristic curves when the light sensing module 130 corresponds to the light-emitting module 120. As shown in FIG. 7A, current-voltage characteristic curves represent relationship between a current and a voltage passing through a light detection transistor so as to determine basic parameters and circuit characteristics of the light detection transistor through the graph, which is often called "current-voltage characteristic curve graphs".

Furthermore, in the current-voltage characteristic curves IV, the vertical axis IC represents the magnitude of a collector bias voltage (VCC)/a resistance value (R) corresponding to the collector bias voltage, the horizontal axis VCE represents a collector-emitter voltage (VCE). Additionally, these solid lines BL1-BL4 in FIG. 7A are curves formed by light intensities (that is, light intensities of the light-emitting diode 121) received by the light detection transistor 150. These dashed lines DL are bias load lines L of the light detection transistor 150. One of the different bias load lines L (represent different resistance values) and one of the different light intensities (collector currents corresponding to different base currents) intersects to define a unique operation point OP. Therefore, an extended line linearly extends from an intersection point O where the vertical axis IC meets the horizontal axis VCE along unbent line segments of the solid lines BL1-BL4 to form a dividing line D. The dividing line D divides the current-voltage characteristic curves IV into a saturation region S and an active region A.

However, as shown in FIG. 7B, since the operation point OP of the light detection transistor 150 on the current-voltage characteristic curve IV still falls into the saturation region S (comprises the saturation region S and the dividing line D of the active region A), an output voltage of the light detection transistor 150 in the saturation region S (comprises the saturation region S and the dividing line D of the active region A) will not change even though light collected has a slight change (such as from the solid line BL to the dashed line DM). Hence, the light detection transistor 150 still cannot distinguish the slight change of light source. As a result, a difference between the first light-intensity signal and the second light-intensity signal cannot be sensed so that the detection of the specific region of the translucent medium cannot be performed.

Conversely, as shown in FIG. 7C, even when a voltage level of light (solid line BL) signal detected by the light detection transistor 150 has a slight change (such as dashed line DM), the light detection transistor 150 is able to distinguish the slight change of light source because the operation point OP of the light detection transistor 150 falls into the active region A. As a result, the difference between the first light-intensity signal and the second light-intensity signal can be sensed so that the detection of the specific region of the translucent medium can be performed.

Hence, it can be seen that in order to render the operation point OP of the light detection transistor 150 on the current-voltage characteristic curve IV to be adjusted into the active region A, the light-emitting module or the light sensing module is first adjusted before step 301 of the identifying method for detecting the specific region of the translucent medium in FIG. 3 so that the operation point OP of the light sensing module (such as the light detection transistor) on the current-voltage characteristic curve IV is shifted to the active region A of the current-voltage characteristic curve IV, according to the research by inventor(s) of the present disclosure.

Fifth Embodiment

Figure 8:
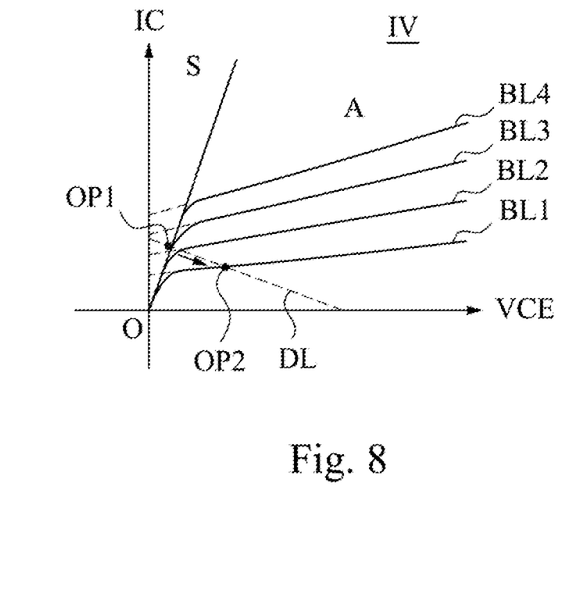
FIG. 8 depicts current-voltage characteristic curves when a light sensing module corresponds to a light-emitting module according to a fifth embodiment of this disclosure.

FIG. 8 depicts current-voltage characteristic curves when a light sensing module corresponds to a light-emitting module according to a fifth embodiment of this disclosure. As shown in FIG. 2 and FIG. 8, a step for adjusting a light-emitting module or a light sensing module according to the present embodiment further comprises: adjusting a light intensity of the light-emitting diode 121 of the light-emitting module 120, such as reducing a light intensity of the light-emitting module 120, so that an operation point OP1 of the light sensing module 130 in the saturation region S (comprises the saturation region S and the dividing line D of the active region A) is shifted to the active region A to become an operation point OP2.

In greater detail, in order to reduce the light intensity of the light-emitting module 120, the realization method is to fix a resistance value of the bias resistor 151 of the light sensing module 130. For example, the driving resistor 122 can be changed to a variable resistor and the driving resistor 122 is passively adjusted so as to adjust the light intensity of the light-emitting module 120. The operation point OP2 of the light sensing module 130 on the current-voltage characteristic curve is thus shifted to the active region A.

In addition, in order to reduce the light intensity of the light-emitting module 120, the realization method may be reducing a strength of a voltage source V of the light-emitting module 120.

Sixth Embodiment

Figure 9:
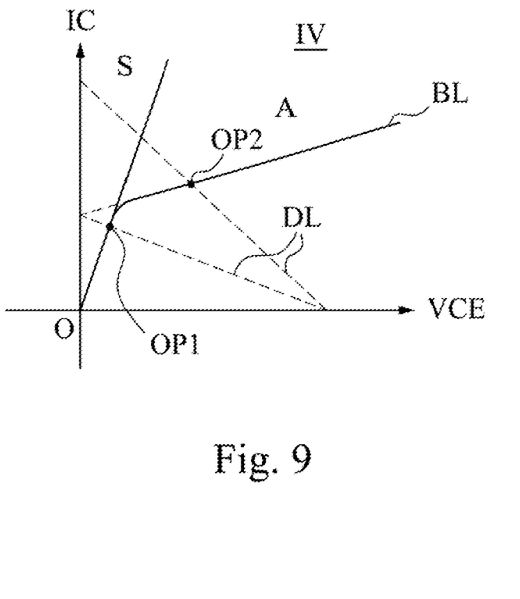
FIG. 9 depicts a current-voltage characteristic curve when a light sensing module corresponds to a light-emitting module according to a sixth embodiment of this disclosure.

FIG. 9 depicts a current-voltage (I-V) characteristic curve when a light sensing module corresponds to a light-emitting module according to a sixth embodiment of this disclosure. As shown in FIG. 2 and FIG. 9, a step for adjusting a light-emitting module or a light sensing module according to the present embodiment further comprises: adjusting the resistance value of the bias resistor 151 of the light sensing module 130 so that the operation point OP1 of the light sensing module 130 in the saturation region S (comprises the saturation region S and the dividing line D of the active region A) of the current-voltage characteristic curve IV becomes the operation point OP2 in the active region A.

In greater detail, one of the realization methods is to fix a resistance value of the driving resistor 122 of the light-emitting module 120. For example, the bias resistor 151 is changed to a variable resistor so that the bias resistor 151 can be variably adjusted to allow the operation point OP2 of the light sensing module 130 on the current-voltage characteristic curve IV to be shifted to the active region A.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of the disclosure provided they fall within the scope of the following claims and their equivalents.

What is claimed is:

1. An identifying device for detecting a specific region of a translucent medium, comprising:
   a driving unit configured to drive a translucent medium to move along a direction;
   a light-emitting module configured to emit light to intersect the direction;
   a light sensing module configured to (1) sense the light which has been passed through the translucent medium at one time instant so as to generate a first light-intensity signal, to (2) divide and stabilize voltages of the first light-intensity signal to derive a second light-intensity signal, and to (3) compare the second light-intensity signal with the first light-intensity signal to generate a comparison result; and
   a processing unit configured to determine whether a specific region of the translucent medium is exactly positioned between the light-emitting module and the light sensing module based on the comparison result,
   wherein the light-emitting module or the light sensing module is adjusted to allow an operation point of the light sensing module on a current-voltage characteristic curve to be in an active region of the current-voltage characteristic curve.

2. The identifying device for detecting the specific region of the translucent medium of claim 1, wherein the light sensing module comprises:
   a comparison device having a first input terminal, a second input terminal, and an output terminal, and configured to compare a voltage level of the first light-intensity signal with a voltage level of the second light-intensity signal so as to generate the comparison result;
   a voltage regulator circuit electrically connected to the second input terminal of the comparison device, and configured to divide and stabilize the voltages of the first light-intensity signal to derive the second light-intensity signal, and then transmitting the second light-intensity signal to the second input terminal of the comparison device; and
   a light detection transistor electrically connected to the first input terminal of the comparison device and the voltage regulator circuit, and configured to sense the light at the one time instant so as to generate the first light-intensity signal, and transmitting the first light-intensity signal to the first input terminal of the comparison device and the voltage regulator circuit.

3. The identifying device for detecting the specific region of the translucent medium of claim 2, wherein the voltage regulator circuit comprises:
   a voltage divider circuit electrically connected to the light detection transistor, and configured to divide the voltages of the first light-intensity signal, wherein, a voltage level of the first light-intensity signal which the voltages thereof has been divided is lower than the voltage level of the first light-intensity signal which the voltages thereof has not divided yet; and
   a voltage buffer circuit electrically connected to the voltage divider circuit and the second input terminal of the comparison device, and configured to stabilize the divided voltages of the first light-intensity signal.

4. The identifying device for detecting the specific region of the translucent medium of claim 3, wherein the voltage divider circuit comprises at least two resistors connected in series.

5. The identifying device for detecting the specific region of the translucent medium of claim 3, wherein the voltage buffer circuit comprises a capacitor.

6. The identifying device for detecting the specific region of the translucent medium of claim 2, wherein the light-emitting module comprises a light-emitting diode and a driving resistor, the driving resistor is electrically connected to the light-emitting diode, the driving resistor is a variable resistor, the variable resistor is adjusted to allow the operation point of the light detection transistor on the current-voltage characteristic curve to be in the active region of the current-voltage characteristic curve.

7. The identifying device for detecting the specific region of the translucent medium of claim 2, wherein the light sensing module further comprises a bias resistor, the bias resistor is electrically connected to the light detection transistor and the voltage regulator circuit, the bias resistor is a variable resistor, the variable resistor is adjusted to allow the operation point of the light detection transistor on the current-voltage characteristic curve to be in the active region of the current-voltage characteristic curve.

8. The identifying device for detecting the specific region of the translucent medium of claim 1, wherein the light-emitting module and the light sensing module are located on two opposite sides of the translucent medium.

9. The identifying device for detecting the specific region of the translucent medium of claim 1, wherein the light-emitting module and the light sensing module are located on a same side of the translucent medium.

10. An identifying method for detecting a specific region of a translucent medium, comprising:
    adjusting a light-emitting module or a light sensing module to allow an operation point of the light sensing module on a current-voltage characteristic curve to be in an active region of the current-voltage characteristic curve;
    driving a translucent medium;
    emitting light to the driven translucent medium by the light-emitting module;
    sensing the light which has been passed through the translucent medium by the light sensing module to generate a first light-intensity signal based on the light sensed at one time instant, dividing and stabilizing voltages of the first light-intensity signal to derive a second light-intensity signal;
    comparing a voltage level of the first light-intensity signal with a voltage level of the second light-intensity signal to generate a comparison result; and
    determining whether a specific region of the translucent medium is exactly positioned between the light-emitting module and the light sensing module based on the comparison result.

11. The identifying method for detecting the specific region of the translucent medium of claim 10, wherein when the specific region of the translucent medium is an edge of the translucent medium, and determining whether the specific region of the translucent medium is exactly positioned between the light-emitting module and the light sensing module based on the comparison result, further comprises:
    determining whether the edge of the translucent medium is exactly positioned between the light-emitting module and the light sensing module when the voltage level of the first light-intensity signal is lower than the voltage level of the second light-intensity signal.

12. The identifying method for detecting the specific region of the translucent medium of claim 10, wherein when the specific region of the translucent medium is one of a plurality of grating convex lenses of the translucent medium, and determining whether the specific region of the translucent medium is exactly positioned between the light-emitting module and the light sensing module based on the comparison result, further comprises:

determining whether the one of the plurality of grating convex lenses of the translucent medium is exactly positioned between the light-emitting module and the light sensing module when the voltage level of the first light-intensity signal is higher than the voltage level of the second light-intensity signal.

13. The identifying method for detecting the specific region of the translucent medium of claim 12, wherein when the voltage level of the first light-intensity signal is lower than the voltage level of the second light-intensity signal, determining whether a furrow between any of the two adjacent grating convex lenses of the translucent medium is exactly positioned between the light-emitting module and the light sensing module.

14. The identifying method for detecting the specific region of the translucent medium of claim 10, wherein adjusting the light-emitting module or the light sensing module to allow the operation point of the light sensing module on the current-voltage characteristic curve to be in the active region of the current-voltage characteristic curve further comprises:

adjusting light intensities of the light-emitting module.

15. The identifying method for detecting the specific region of the translucent medium of claim 10, wherein adjusting the light-emitting module or the light sensing module to allow the operation point of the light sensing module on the current-voltage characteristic curve to be in the active region of the current-voltage characteristic curve further comprises:

adjusting resistance values of a bias resistor of the light sensing module.

16. An identifying method for detecting a specific region of a translucent medium comprising:

adjusting a light-emitting module or a light sensing module to allow an operation point of the light sensing module on a current-voltage characteristic curve to be in an active region of the current-voltage characteristic curve;

driving a translucent card;

emitting light to the driven translucent card by the light-emitting module;

sensing the light which has been passed through the translucent card by the light sensing module to generate a first light-intensity signal based on the light sensed at one time instant, dividing and stabilizing voltages of the first light-intensity signal to derive a second light-intensity signal;

comparing a voltage level of the first light-intensity signal with a voltage level of the second light-intensity signal to generate a comparison result; and     determining that an edge of the translucent card is exactly positioned between the light-emitting module and the light sensing module when the comparison result is that the voltage level of the first light-intensity signal is lower than the voltage level of the second light-intensity signal; and     determining that a medium body of the translucent card is exactly positioned between the light-emitting module and the light sensing module when the comparison result is that the voltage level of the first light-intensity signal is higher than the voltage level of the second light-intensity signal.

17. An identifying method for detecting a specific region of a translucent medium comprising:

adjusting a light-emitting module or a light sensing module to allow an operation point of the light sensing module on a current-voltage characteristic curve to be in an active region of the current-voltage characteristic curve;

driving a translucent grating structure;

emitting light to the driven translucent grating structure by the light-emitting module;

sensing the light which has been passed through the translucent grating structure by the light sensing module to generate a first light-intensity signal based on the light sensed at one time instant, dividing and stabilizing voltages of the first light-intensity signal to derive a second light-intensity signal;

comparing a voltage level of the first light-intensity signal with a voltage level of the second light-intensity signal to generate a comparison result; and     determining that a furrow between any of two adjacent grating convex lenses of the translucent grating structure is exactly positioned between the light-emitting module and the light sensing module when the comparison result is that the voltage level of the first light-intensity signal is lower than the voltage level of the second light-intensity signal.

18. The identifying method for detecting the specific region of the translucent medium of claim 17, further comprising:

determining that an edge of the translucent grating structure is exactly positioned between the light-emitting module and the light sensing module when the comparison result being generated for a first time is that the voltage level of the first light-intensity signal is lower than the voltage level of the second light-intensity signal.

19. The identifying method for detecting the specific region of the translucent medium of claim 17, further comprising:

determining that one of the grating convex lenses of the translucent grating structure is exactly positioned between the light-emitting module and the light sensing module when the comparison result is that the voltage level of the first light-intensity signal is higher than the voltage level of the second light-intensity signal.

\* \* \* \* \*